Aug. 14, 1923.
T. H. WHITE
1,465,106
DEVICE FOR SETTING CALIPERS
Filed March 5, 1921
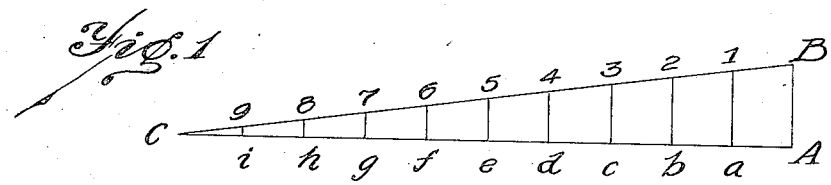
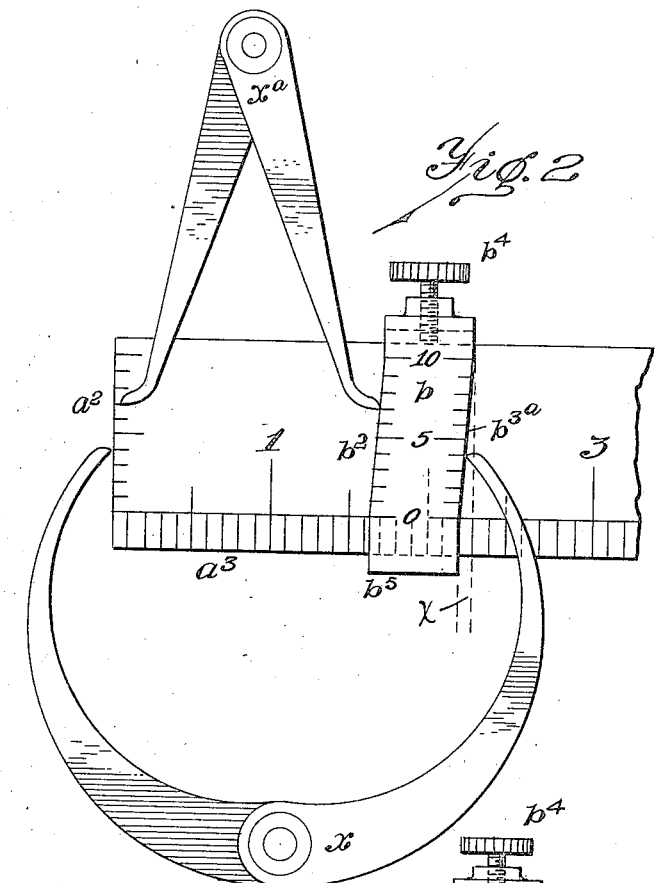
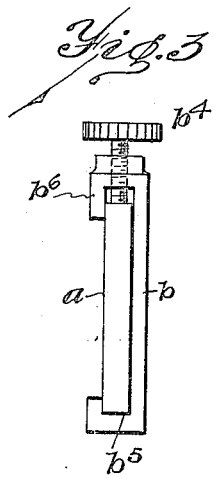
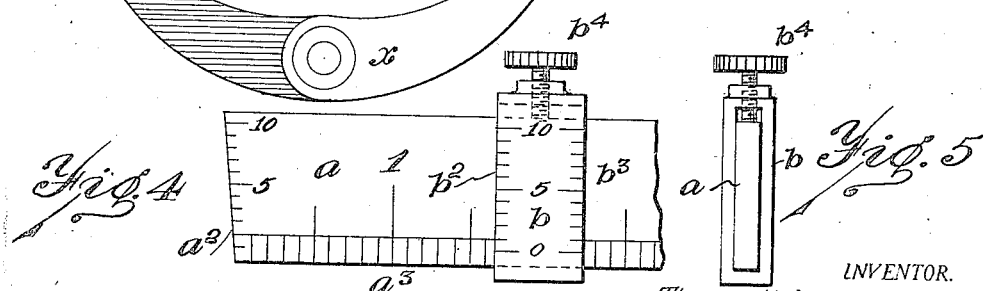
INVENTOR.
Thomas Hyler White. (Deceased)
Florence A. White. (Administratrix)
Raymond A. Parker
ATTORNEY.

Patented Aug. 14, 1923.

1,465,106

UNITED STATES PATENT OFFICE.

THOMAS HYLER WHITE, DECEASED, LATE OF THORNTON HEATH, ENGLAND; BY FLORENCE A. WHITE, ADMINISTRATRIX, OF THORNTON HEATH, ENGLAND, ASSIGNOR OF ONE-FOURTH TO CHARLES G. TROSIEN, OF PONTIAC, MICHIGAN, AND ONE-FOURTH TO ELLIOTT J. STODDARD, OF HIGHLAND PARK, MICHIGAN.

DEVICE FOR SETTING CALIPERS.

Application filed March 5, 1921. Serial No. 450,047.

*To all whom it may concern:*

Be it known that FLORENCE A. WHITE, administratrix of the estate of THOMAS HYLER WHITE, deceased, a subject of the King of Great Britain, residing at 41a Frant Road, Thornton Heath, Surrey, England, shows that said THOMAS HYLER WHITE invented a certain new and useful Improvement in Devices for Setting Calipers, for which application was filed in England February 17th, 1920, British Patent No. 152,261, and declares the following to be a full, clear, and exact description of the same, such as will enable others skilled in the art to which it pertains to make and use the same, reference being had to the accompanying drawings, which form a part of this specification.

My invention relates to a device for setting calipers and the process of using the same.

In the accompanying drawings,

Figure 1 is a diagram illustrating the mode of using my improved caliper setting device.

Fig. 2 is a plan view of a device embodying my invention showing also its use in setting inside, and outside, calipers.

Fig. 3 is an elevation looking from the left of Fig. 2, the calipers being omitted.

Fig. 4 is a detail showing a modified form of the apparatus in Fig. 2.

Fig. 5 is a view similar to Fig. 3 showing the modification of Fig. 4.

$a$ is a rule, or strip of material, having a scale $a^3$ along one of its longitudinal edges and a scale $a^2$ along the edge at one end. These scales may be in inches and tenths of an inch.

$b$ is a rider, the longer portion of which extends transversely across the face of the rule $a$. The ends of the rider $b$ are turned over to engage over the edges of the rule $a$ as shown at $b^5$ $b^6$ in Fig. 3. $b^4$ is a set screw adapted to be manipulated to bind the rider $b$ against the rule $a$ and fix it in position at its adjusted place. The portion of the rider $b$ which extends across the face of the rule $a$ has parallel edges $b^2$ $b^3$ which are slightly inclined so that they do not extend quite at right angles to the longitudinal edges of said rule. The edges $b^2$ $b^3$ are graduated to correspond to the graduations $a^2$ $a^3$.

$x$ represents an outside caliper and $x^a$ an inside caliper.

The method of using the above described device is as follows:

When it is desired to set the calipers with their points at a predetermined distance apart the rider $b$ is moved along until its lower portion above the scale $a^3$ comes to the distance required with as near an approximation as can be conveniently reached with the unaided hand and eye of the operator. The inside calipers are then adjusted as shown at $x^a$ with one point at the edge $a^2$ and the other point at the edge $b^2$ of the rider $b$, these points being in a line parallel to the scale $a^3$. The finer adjustment of the points of the calipers will be obtained by putting said points at the proper divisions of the scales $a^2$ $b^2$.

The outside calipers $x$ may be similarly adjusted between the edge of the scale $a^2$ and the edge $b^3$ of the rider.

The method of graduating the edges $b^2$ and $b^3$ of the rider is illustrated in Fig. 1. Said edges are inclined to the vertical to such a degree that their departure from a vertical line in their entire length will be one division of the scale $a^3$, in this instance one-tenth of an inch, and said edges are graduated in equal divisions upon the normal or perpendicular line. Thus let AC represent the vertical or normal line, then AB will be the departure from the vertical in the length of the line BC. The line AC may be divided for instance into ten spaces indicated in Fig. 1 by the vertical lines $a$, $b$, $c$, $d$, $e$, $f$, $g$, $h$, $i$, and the ends of the line AC. Where said vertical lines cut the line CB will be the divisions of the scale upon the edges $b^2$ and $b^3$. It will be obvious that the departure of the lines $b^2$ $b^3$ from the vertical for each division of the scale will be one-tenth of one of said divisions, that is to say one-hundredth of an inch, and thus the calipers may be accurately set to a tenth of a division which will be indicated by the position of the caliper along the lines $b^2$ $b^3$.

Instead of having the edge $b^2$ inclined to the vertical with reference to the scale $a^3$ the end edge of the rule may be so cut as shown in Fig. 4, as it is obvious that it is the relative location of these two scales that is functional, and instead of having the rider b merely embrace the edges of the rule a said rider may extend completely across both faces of said rule as shown in Fig. 5.

Claims:

1. The combination of a rule provided with a scale extending along one of the longitudinal edges of the rule and a second scale extending along one of the ends of the rule, a rider adapted to be adjusted to different positions along said first-mentioned scale and having a scale extending transversely with reference to the first-mentioned scale, the scales on the end of the rule and on the rider being arranged at a definite oblique angle to each other for the purpose described.

2. The combination of a rule having a scale extending along one of the longitudinal edges of the rule, a rider adapted to slide along said scale and having a part extending transversely across the same, said rule being provided with a second scale along its end edge, the transverse part of said rider and the end edge of said rule being set at a definite angle to each other for the purpose described.

3. The combination of a rule having a scale extending along one of the longitudinal edges thereof, a rider adapted to slide along said rule and scale and having a part extending transversely across said rule, said rule being provided with a second scale along its end edge, the transverse part of said rider having an adjacent and a remote edge with reference to the end edge of said rule, said edges of said transverse part extending at a definite angle to the end edge of said rule, for the purpose described.

In testimony whereof I sign this specification.

FLORENCE A. WHITE.
*Administratrix of Thomas Hyler White, deceased.*